United States Patent [19]

Sato et al.

[11] Patent Number: 5,812,731
[45] Date of Patent: Sep. 22, 1998

[54] SIGNAL PROCESSING APPARATUS FOR ADDING SYNCHRONIZING SIGNAL TO HORIZONTAL AND VERTICAL BLANKING PERIODS OF A COLOR DIFFERENCE SIGNAL

[75] Inventors: Koichi Sato; Yasuhiro Yamamoto, both of Tokyo, Japan

[73] Assignee: Asahi Kogaku Kogyo Kabushiki Kaisha, Tokyo, Japan

[21] Appl. No.: 764,230

[22] Filed: Dec. 13, 1996

Related U.S. Application Data

[63] Continuation of Ser. No. 248,177, May 24, 1994, abandoned.

[30]  Foreign Application Priority Data

May 25, 1993  [JP]  Japan ..................................... 5-145582

[51] Int. Cl.⁶ ............................................... H04N 07/18
[52] U.S. Cl. .............................. 386/45; 386/12; 386/31; 348/845.2; 348/519; 348/502
[58] Field of Search ..................... 358/319, 316, 358/317; 386/12, 31, 48, 45, 71, 84, 131; 348/845.2, 501, 502, 519, 531, 512

[56]  References Cited

U.S. PATENT DOCUMENTS

| | | | |
|---|---|---|---|
| 4,994,923 | 2/1991 | Itoh et al. | 358/316 |
| 5,029,012 | 7/1991 | Sato | 358/316 |
| 5,083,212 | 1/1992 | Owa et al. | 358/319 |
| 5,187,569 | 2/1993 | Tani | 358/316 |
| 5,225,913 | 7/1993 | Sato | 358/316 |
| 5,345,271 | 9/1994 | Shin | 348/525 |
| 5,570,200 | 10/1996 | Banno et al. | 386/45 |

Primary Examiner—Tommy P. Chin
Attorney, Agent, or Firm—Greenblum & Bernstein, P.L.C.

[57]  ABSTRACT

A signal processing circuit for adding a synchronizing signal to a predetermined signal, wherein the synchronizing signal oscillates to one side from a reference level of the synchronizing signal, and wherein the predetermined signal oscillates to one side from a reference level of the synchronizing signal, and wherein the predetermined signal oscillates to one or both sides from a reference level of the predetermined signal. The signal processing circuit includes a synchronizing signal adding circuit for adding the synchronizing signal to the predetermined signal, and a signal level adjusting circuit for adjusting the reference level and the amplitude of the synchronizing signal, wherein the signal level adjusting circuit makes the reference level of the synchronizing signal substantially identical to the reference level of the predetermined signal, and also makes an amplitude of the synchronizing signal with respect to the reference level thereof larger than the maximum deviation of the predetermined signal from the reference level thereof.

20 Claims, 4 Drawing Sheets

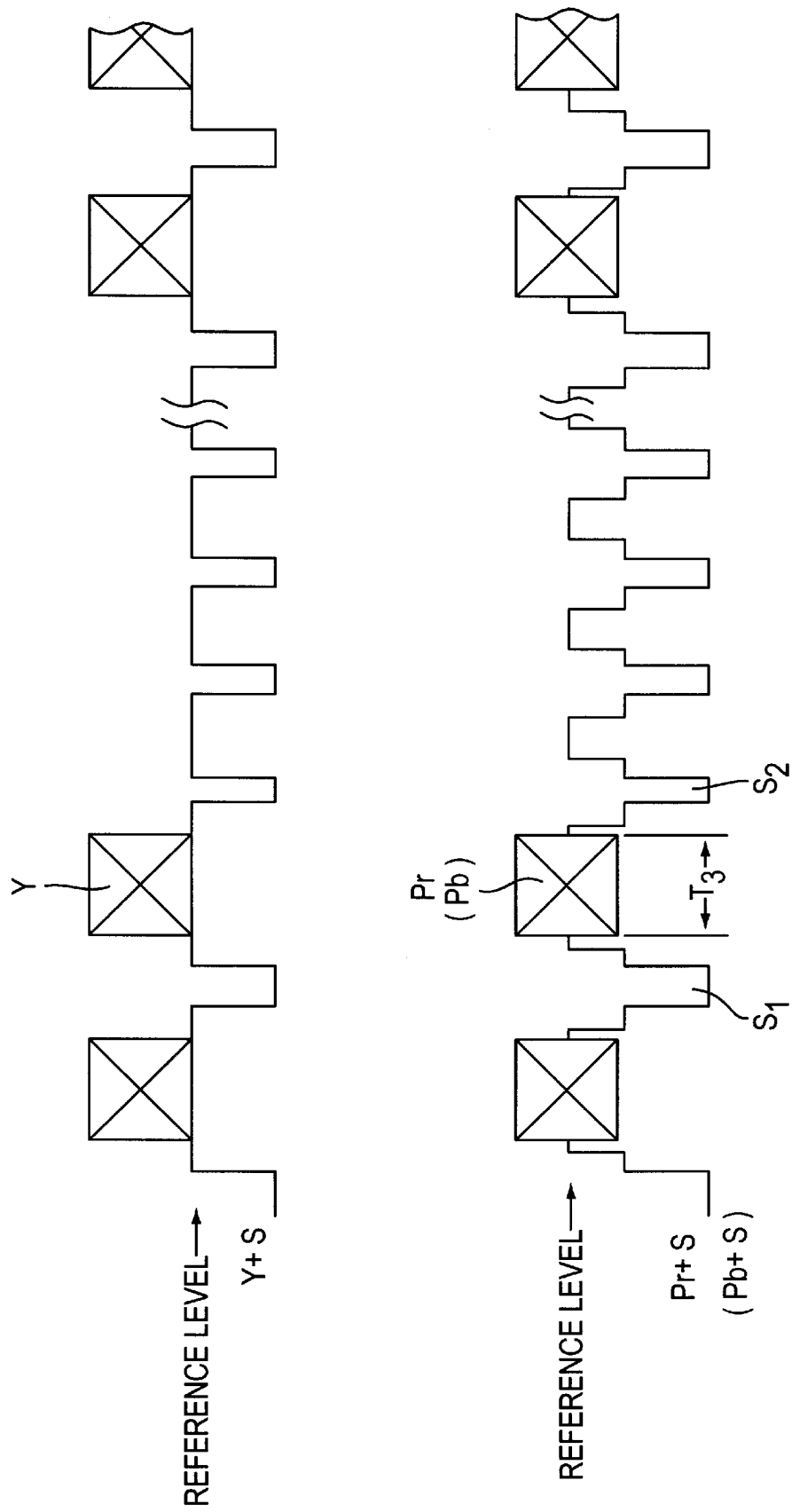

SIGNAL PROCESSING APPARATUS FOR ADDING SYNCHRONIZING SIGNAL TO HORIZONTAL AND VERTICAL BLANKING PERIODS OF A COLOR DIFFERENCE SIGNAL

This application is a continuation of application Ser. No. 08/248,177, filed May 24, 1994, now abandoned.

BACKGROUND OF THE INVENTION

1. Field of the Invention

The present invention relates to a signal processing circuit for adding a synchronizing signal to a signal which oscillates or fluctuates with respect to a reference level. The present invention also relates to a still video apparatus having such a signal processing circuit.

2. Description of Related Art

There are various known signal processing circuits for adding a synchronizing signal to various signals. In general, a synchronizing signal which is to be added, by means of a signal processing circuit, to a signal which moves to one side of a reference level (e.g., positive side of the reference level), such as a luminance signal Y or a color signal (R, G, B) which is included in a picture signal, is a signal which moves to the other side of the reference level (e.g., negative side of the reference level) in order that the synchronizing signal can be easily separated from the picture signal, the signal separation being carried out in a subsequent process.

However, if a similar synchronizing signal is added to color difference signals (R−Y, B−Y) by the signal processing circuit, the following problems exist. The amplitude of the color difference signals which move (i.e., oscillate) to both sides of the reference level thereof (i.e., pedestal level) with respect to the reference level sometimes exceeds the amplitude of the synchronizing signal with respect to the reference level. If this is the case, it is difficult to detect the synchronizing signal upon subsequent separation thereof from the color difference signals, resulting in a failure in the separation of the synchronizing signal.

Accordingly a primary object of the present invention is to provide a signal processing circuit which can add a synchronizing signal, to a fluctuating or oscillating signal which moves to both sides of a reference level, in a manner such that the added synchronizing signal can be easily and correctly separated from the fluctuating or oscillating signal in a subsequent operation.

SUMMARY OF THE INVENTION

In order to achieve the object mentioned above, according to an aspect of the present invention, a signal processing circuit is provided for adding a synchronizing signal to a predetermined signal, wherein the synchronizing signal oscillates to one side from a reference level of the synchronizing signal, and wherein the predetermined signal oscillates to one or both sides from a reference level of the predetermined signal. The signal processing circuit includes a synchronizing signal adding circuit for adding the synchronizing signal to the predetermined signal, and a signal level adjusting circuit for adjusting the reference level and the amplitude of the synchronizing signal. The signal level adjusting circuit makes the reference level of the synchronizing signal substantially identical to the reference level of the predetermined signal, and makes the amplitude of the synchronizing signal, with respect to the reference level thereof, larger than the maximum deviation of the predetermined signal from the reference level thereof.

In an embodiment of the invention, the predetermined signal comprises a picture signal. The picture signal can include two kinds of color difference signals. The color difference signals oscillate to both sides from the reference level.

The synchronizing signal adding circuit adds the synchronizing signals, which oscillate to one side from the reference level thereof, to the color difference signals.

In an embodiment of the present invention, the predetermined signal comprises a luminance signal which is included in a picture signal. The luminance signal oscillates to one side from the reference level thereof. In this embodiment, the synchronizing signal adding circuit adds to the luminance signal a synchronizing signal which oscillates to a side opposite the side to which the luminance signal oscillates.

Preferably, the synchronizing signals include horizontal and vertical synchronizing signals. The reference level of the synchronizing signals is preferably a pedestal level.

According to another aspect of the present invention, a video apparatus is provided for recording luminance signals and color signals for one picture plane on a recording medium, including a synchronizing signal adding circuit for adding synchronizing signals to the luminance signals and the color signals, a signal level adjusting circuit for adjusting the synchronizing signals in a manner such that a reference level of the synchronizing signals is kept substantially identical to a reference level of the luminance signals and the color signals and in a manner such that the amplitude of the synchronizing signals from the reference level thereof is larger than the maximum deviation of the luminance signals and the color signals on the synchronizing signal side of the luminance and color signal reference level from the reference level thereof, and a recording device for recording the luminance signals and color signals, to which the synchronizing signals have been added, on the recording medium.

According to still another aspect of the present invention, a still video apparatus is provided for recording luminance signals and color signals corresponding to one picture plane onto different recording tracks of a recording medium having a plurality of recording tracks, including a synchronizing signal adding circuit for adding synchronizing signals to the luminance signals and color signals, a signal level adjusting circuit for adjusting the synchronizing signals in a manner such that a reference level of the synchronizing signals is kept substantially identical to a reference level of the luminance signals and color signals and in a manner such that the amplitude of the synchronizing signals from the reference level thereof is larger than the maximum deviation of the luminance signals and color signals on the synchronizing signal side of the luminance and color signal reference level from the reference level thereof, and a recording device for recording the luminance signals and color signals, to which the synchronizing signals have been added, on the different recording tracks of the recording medium.

The present disclosure relates to subject matter contained in Japanese patent application No. HEI-145582 (filed on May 25, 1993) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Although the present invention is applied to a still video apparatus in the illustrated embodiment, which will be discussed below, the application of a signal processing circuit according to the present invention is not limited to a specific apparatus or instrument.

Figure 1:
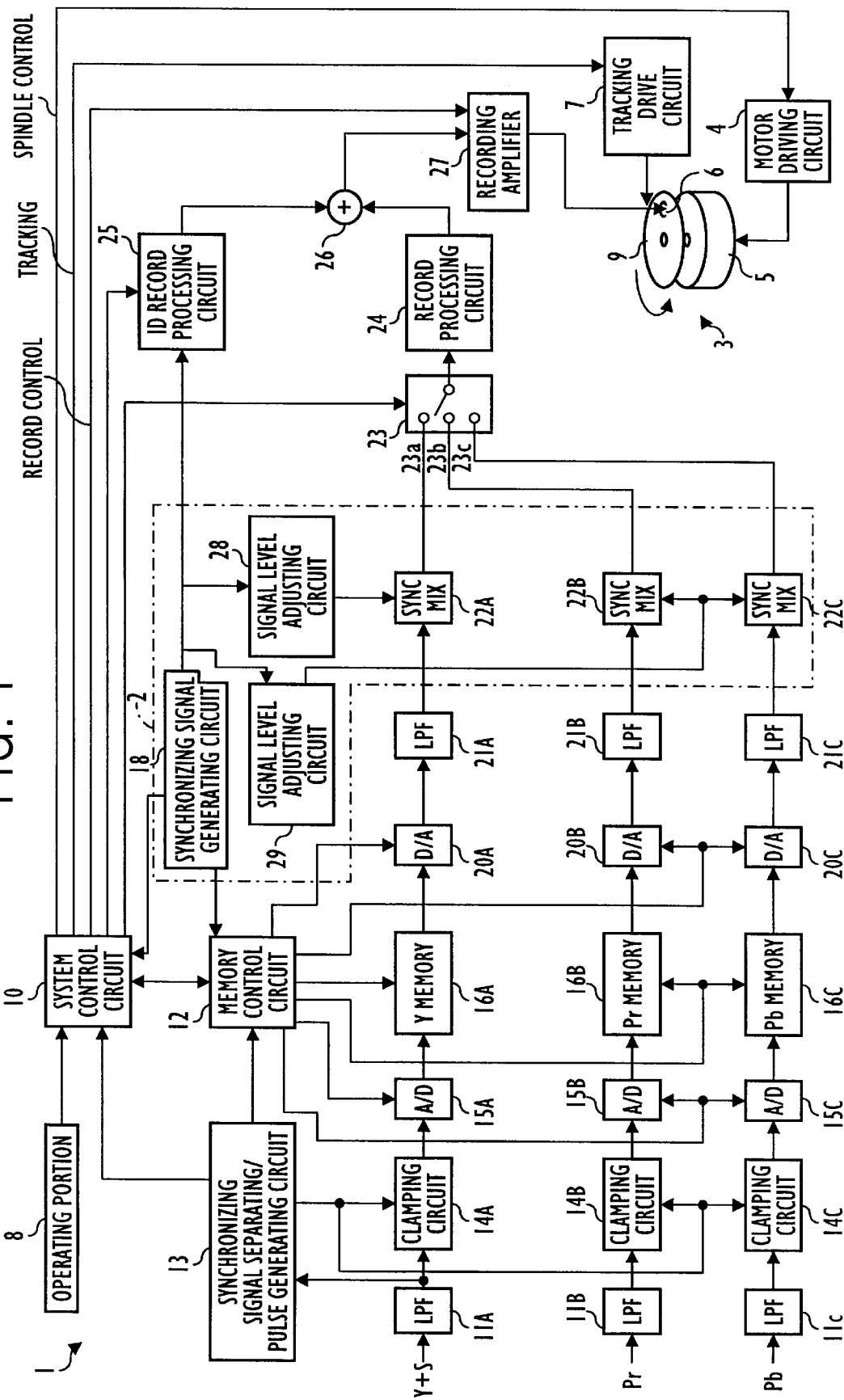
FIG. 1 is a block diagram of a recording system of a still video apparatus having a signal processing circuit incorporated therein, according to the present invention, by way of example.

FIG. 1 is a block diagram of a recording system of a still video apparatus having a signal processing circuit incorporated therein, according to an embodiment of the present invention. In FIG. 1, the still video apparatus 1 includes a system control circuit 10 which generically controls various functions of the still video apparatus, and which will be discussed below, and a signal processing circuit 2. The system controller 10 is usually comprises a micro computer. The signal processing circuit 2 will be discussed hereinafter.

The still video apparatus 1 is provided with a magnetic disc driving mechanism 3 having a spindle motor 5 which can rotate at high speed. The rotation of the spindle motor 5 is controlled by a motor driving circuit 4 which supplies the spindle motor 5 with the power to drive the same. The system control circuit 10 controls the operation of the motor driving circuit 4.

A magnetic disc 9, which is a recording medium for recording picture signals, sound signals, and various data associated with the picture signals, etc., is loaded in the magnetic disc driving mechanism 3, for example, together with a disc case (not shown) in which the magnetic disc 9 is received. The magnetic disc 9 is made of a circular sheet which is coated thereon with a magnetic layer and is usually provided with a plurality of circular recording tracks (normally, 52 recording tracks) in a concentric arrangement.

The spindle motor 5 has a drive shaft which can be fitted in the center hole of the magnetic disc 9, so that upon recording or reproducing of data, the magnetic disc 9 can be rotated by the spindle motor 5 at a constant speed (e.g., 3600 rpm in case of a NTSC system or 3000 rpm in case of the PAL system).

FG pulses are outputted from the spindle motor 5 at a cycle corresponding to the number of revolutions (rotational speed) of the spindle motor 5, and one PG pulse is outputted for each rotation of the magnetic disc from the center of the magnetic disc 9 connected to the drive shaft of the spindle motor 5 or in the vicinity thereof. The system control circuit 10 controls the rotation of the spindle motor 5 in accordance with these pulse signals so as to rotate the magnetic disc 9 at a constant speed upon recording and reproducing of data.

The magnetic disc driving mechanism 3 is provided with a magnetic head 6 which is continuously or discontinuously (i.e., intermittently) moved in the radial direction of the magnetic disc 9 by a stepping motor (not shown). Namely, upon recording or reproducing, the stepping motor is driven to move the magnetic head 6 to a predetermined recording track of the magnetic disc 9. Furthermore, upon reproducing, the stepping motor carries out an auto-tracking operation for a fine adjustment of the magnetic head 6 so that the magnetic head 6 is located at an appropriate position above a predetermined recording track so as to obtain the maximum output.

The displacement, and the speed and timing of the movement of the magnetic head 6 are controlled by a tracking drive circuit 7 which is in turn controlled by the system control circuit 10.

An operating portion 8 is connected to the system control circuit 10 and is optionally provided with a selection switch (not shown) which is actuated to select a field recording mode or a frame recording mode, a head feeding switch (not shown) which is actuated to move the magnetic head 6 to a predetermined recording track of the magnetic disc 9, a Rec (i.e., recording) switch (not shown) which is actuated to record the picture signals onto the magnetic disc 9, a selection switch (not shown) which is actuated to select a normal recording mode (i.e., standard picture), and a high definition mode, etc. In case of a still video apparatus having both the recording system and the reproducing system, the operating portion 8 is provided with a selection switch (not shown) which is actuated to select the recording mode or a reproducing mode (play-back mode).

An indicator (not shown) is also connected to the system control circuit 10, in which for example, field recording/ frame recording, normal picture/high definition picture, recording track number, presence or absence of data on the recording track, data on photographing date, etc., loading or unloading of the magnetic disc 9, power source data, strobe emission data, current time, etc., are selectively indicated through a liquid crystal or light emitting element, etc., in accordance with need. In case of a still video apparatus having both the recording system and the reproducing system, the selection of record/reproduction (play-back) is also indicated in the indicator.

In the case where the still video apparatus is a still video camera, an image-pickup device (not shown) is also provided. The image pickup device comprises a lens system, a diaphragm, a mirror (or mirrors), an optical filter (or filters), a shutter, and a solid-state image sensor (CCD), etc. When the shutter is open, an image of an object to be taken is formed on the CCD through the lens system, etc. Either a CCD for a monochromatic picture or a CCD for a color picture can be used in the present invention. The illustrated embodiments are applied to a color still video apparatus (i.e., still video apparatus for a color picture) for the sake of convenience.

The CCD converts the formed image (i.e., photo data) to electric data and outputs color signals (R, G, B). The color signals are amplified by respective amplifiers (not shown) and are separated into a luminance signal Y and two color difference signals (R–Y, B–Y) by a process/matrix circuit (not shown). A composite synchronizing signal S (referred to as a synchronizing signal) including timing signals, such as horizontal and vertical synchronizing signals, necessary to reproduce the picture is added to the luminance signal Y by a synchronizing signal generating circuit (not shown). The luminance signal (Y+S) and the color difference signals (R–Y) and (B–Y) are standardized and outputted as a luminance signal (Y+S) and color difference signals Pr and Pb, respectively, as shown in FIG. 1. The amplitudes of the color difference signals Pr and Pb are both set at 350 mV.

If the still video apparatus has no image pickup device, the standardized signals are inputted through respective external input terminals. For instance, a composite video signal, based on an NTSC signal is decoded and standardized by a decoder (not shown) and is inputted as the luminance signal (Y+S) and the color difference signals Pr and Pb through the respective external input terminals.

As can be seen in FIG. 1, the luminance signal (Y+S) passes through a low pass filter 11A to remove a high frequency component thereof which is noise (i.e., aliasing noise by sampling). The synchronizing signal S is separated from the luminance signal (Y+S) by a synchronizing signal separating/pulse generating circuit 13 in which a memory writing clock signal (referred to as a writing clock signal) based on which data is written in the memory and various timing pulse signals are generated. The writing clock signal and the timing pulse signals, thus generated are inputted to a memory control circuit 12, and clamping circuits 14A, 14B and 14C, respectively.

The luminance signal (Y+S) is clamped by the clamping circuit 14A to fix the reference level of the synchronizing signal S to a predetermined value and, thereafter, is converted to a digital signal by an A/D converter 15A and stored in a Y memory 16A. The clamping circuit 14A operates in response to the timing pulse signal (i.e., clamp pulse signal) outputted from the synchronizing signal separating/pulse generating circuit 13.

In the clamping operation, the signal level (i.e., black level) corresponding to the lowest luminance is set to be the reference level (i.e., pedestal level) of the luminance signal component of the luminance signal (Y+S) and the reference level for the adding operation of the synchronizing signal S to the luminance signal in a subsequent stage.

The color difference signal Pr passes the low pass filter 11B and is clamped by the clamping circuit 14B in which the reference level of the portion of the color difference signal Pr to which the synchronizing signal S is to be added in a subsequent operation is fixed to a predetermined value. Thereafter, the color difference signal Pr is converted to a digital signal by an A/D converter 15B and stored in a Pr memory 16B.

Similarly, the color difference signal Pb passes the low pass filter 11C and is clamped by the clamping circuit 14C in which the reference level of the portion of the color difference signal Pb to which the synchronizing signal S is to be added in a subsequent operation is fixed to a predetermined value. Thereafter, the color difference signal Pb is converted to a digital signal by an A/D converter 15C and stored in a Pb memory 16C.

The clamping circuits 14B and 14C are constructed such that the reference levels of the portions of the color difference signals Pr and Pb corresponding to the horizontal and vertical blanking intervals (i.e., the portions to which the synchronizing signals S are to be added in subsequent operations) are fixed to predetermined values. The clamping circuits 14B and 14C operate in response to the timing pulse signals (i.e., clamp pulse signals) outputted from the synchronizing signal separating/pulse generating circuit 13.

In the clamping operations, intermediate signal levels (i.e., achromatic color levels) between the maximum and minimum values of the color difference signals Pr and Pb are set to be the reference levels of the color difference signal components of the color difference signals Pr and Pb and the reference levels for the adding operation of the synchronizing signals S to the color difference signals Pr and Pb in a subsequent stage.

The memory control circuit 12 effects the following control in accordance with the writing clock signals and the timing pulse signals, outputted from the synchronizing signal separating/pulse generating circuit 13, while controlling the writing timing of data into the memories 16A, 16B and 16C.

The A/D converter 15A operates in accordance with the writing clock signal, and the memory control circuit 12 actuates a writing address counter incorporated therein to write digital data of the luminance signals Y in the Y memory 16A at a predetermined address.

Also, the A/D converters 15B and 15C operate in accordance with the writing clock signal, and the memory control circuit 12 actuates the writing address counter to write digital data of the color difference signals Pr and Pb in the Pr memory 16B and the Pb memory 16C at predetermined addresses, respectively.

Note that sampling of the synchronizing signal S contained in the input luminance signal is not effected, so that synchronizing signal S is not written in the memories.

Figure 3:
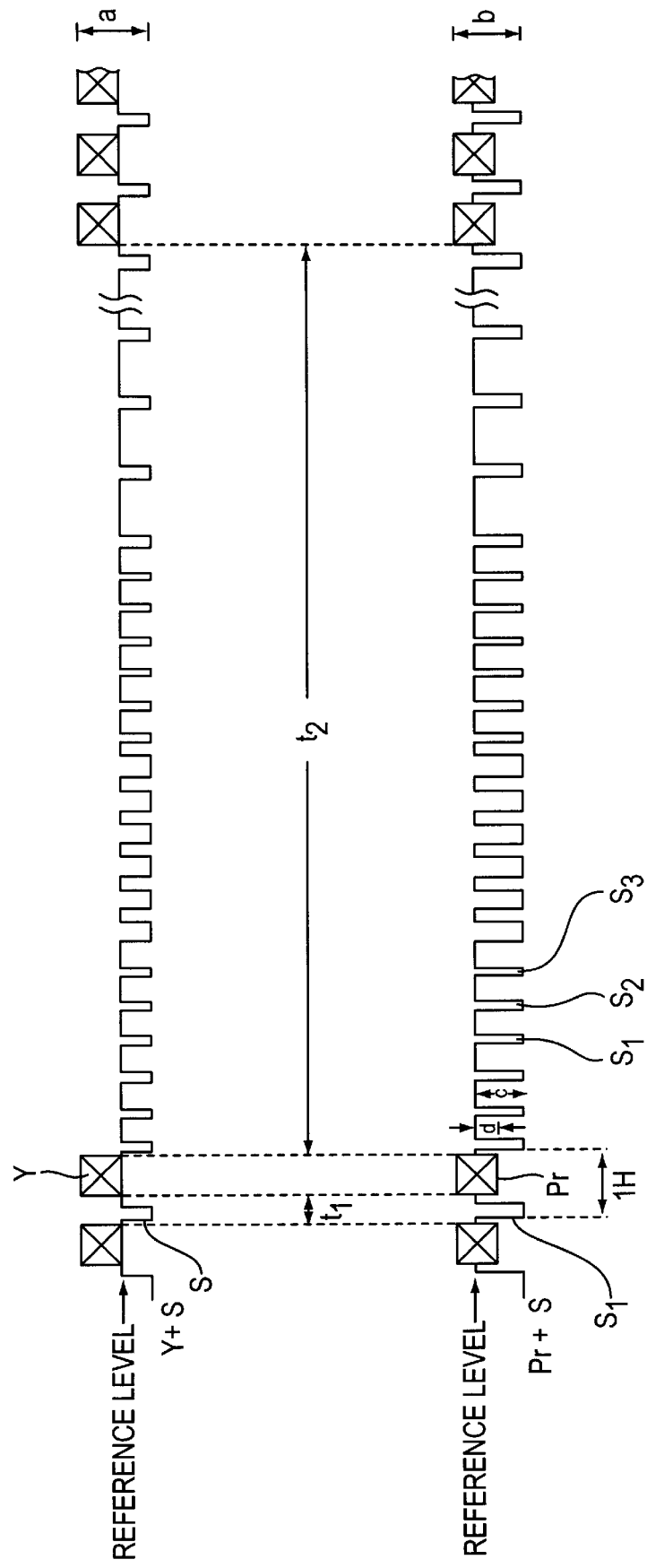
FIG. 3 shows examples of a time chart of a luminance signal and a color difference signal, to which synchronizing signals are added, according to the present invention; and, FIG. 4 shows different examples of a time chart of a luminance signal and a color difference signal, to which synchronizing signals are added, according to the present invention.

The composite synchronizing signals S corresponding to, for example, the NTSC system are generated in the synchronizing signal generating circuit 18. As can be seen in FIG. 3, the synchronizing signal generating circuit 18 has a predetermined synchronizing reference level which is fixed so as not to temporally vary, so that the synchronizing signal generating circuit 18 generates the horizontal and vertical synchronizing signals which move or oscillate to the low level side (i.e., lower side) of the fixed reference level.

In addition to the generation of the horizontal and vertical synchronizing signals S, the synchronizing signal generating circuit 18 generates memory reading clock signals (referred to as reading clock signals), in accordance with which the stored data is read from the respective memories and various timing pulse signals through a clock generating circuit (not shown) incorporated therein. The reading clock signals and the timing pulse signals thus generated are inputted to the memory control circuit 12.

The memory control circuit 12 effects the following control in accordance with the reading clock signals and the timing pulse signals, outputted from the synchronizing signal generating circuit 18, while controlling the reading timing of data into the memories 16A, 16B and 16C.

Namely, in accordance with the reading clock signals and the timing pulse signals, the memory control circuit 12 actuates a reading address counter incorporated therein to read digital data of the luminance signals Y in the Y memory 16A at a predetermined address. At the same time, the D/A converter 20A operates to convert the digital luminance signal Y thus read to an analog signal.

The memory control circuit 12 actuates the reading address counter to read digital data of the color difference signals Pr and Pb stored in the Pr memory 16B and the Pb memory 16C at predetermined addresses, respectively. Simultaneously, the D/A converters 20B and 20C operate to convert the digital color difference signals thus read out to analog signals.

Note that the selection of the writing mode or the reading mode of the memories is controlled by the memory control circuit 12 in accordance with a mode change command signal outputted from the system control circuit 10.

The synchronizing signals S outputted from the synchronizing signal separating/pulse generating circuit 13 and the synchronizing signal generating circuit 18 are also inputted to the system control circuit 10, so that the synchronizing signals S can be employed to control the phase of rotation of the spindle motor 5 or utilized as timing signals for other operations.

In the case that a standard picture (e.g., NTSC signal) is recorded, the writing clock signal generated by the synchronizing separating/pulse generating circuit 13 and the reading clock signal generated by the synchronizing signal generating circuit 18 have an identical frequency.

The luminance signal Y and the color difference signals Pr and Pb, thus converted to analog signals are sent to the respective low pass filters 21A, 21B and 21C to cut high frequency components thereof. Thereafter, the synchronizing signals S are added to the luminance signal Y and the color difference signals Pr and Pb by synchronizing signal adding circuits 22A, 22B and 22C, respectively.

For the luminance signal Y, the level of the synchronizing signal S outputted from the synchronizing signal generating circuit 18 is adjusted to be a predetermined value by a signal level adjusting circuit 28, so that the synchronizing signal S whose level has been adjusted can be added to the luminance signal Y.

For the color difference signals Pr and Pb, the level of the synchronizing signals S outputted from the synchronizing signal generating circuit 18 are adjusted to be predetermined values by a signal level adjusting circuit 29, so that the synchronizing signals S whose levels have been adjusted can be added to the color difference signals Pr and Pb, respectively.

The synchronizing signal generating circuit 18, the synchronizing signal adding circuits 22A, 22B and 22C constitute a synchronizing signal adding means which in turn constitutes a signal processing circuit 2, according to the present invention, together with the signal level adjusting circuits (i.e., attenuators) 28 and 29.

The signal processing circuit 2 operates as follows:

FIG. 3 shows time charts of the luminance signal (Y+S) and the color difference signal (Pr+S), to which the synchronizing signals S have been added by the signal processing circuit 2. Note that the color difference signal (Pb+S) is identical to the color difference signal (Pr+S). Accordingly, no explanation therefor will be given herein.

As may be seen in FIG. 3, the signal processing circuit 2 adds to the color difference signal Pr the synchronizing signal S which has been adjusted by the signal level adjusting circuit 29 so that amplitude "c" of the synchronizing signal from the reference level thereof in the horizontal and vertical blanking intervals $t_1$ and $t_2$ of the color difference signal is larger than maximum amplitude "d" of the color difference signal from the reference level thereof on the same side as the synchronizing signal, while keeping the reference level of the color difference signal Pr substantially identical to the reference level of the synchronizing signal S within the horizontal and vertical blanking intervals $t_1$ and $t_2$ of the color difference signal Pr.

Furthermore, the signal processing circuit 2 adds the synchronizing signal S to the luminance signal Y, while keeping the reference level of the luminance signal Y substantially identical to the reference level of the synchronizing signal S within the horizontal and vertical blanking intervals $t_1$ and $t_2$ of the luminance signal Y.

Since the synchronizing signal S is added to the color difference signal Pr in the synchronizing signal adding circuit 22B, the reference level of the synchronizing signal S within the horizontal and vertical blanking intervals $t_1$ and $t_2$ of the color difference signal Pr is identical to the reference level of the color difference signal Pr.

Similarly, since the synchronizing signal S is added to the luminance signal Y in the synchronizing signal adding circuit 22A, the reference level of the synchronizing signal S within the horizontal and vertical blanking intervals $t_1$ and $t_2$ of the luminance signal Y is identical to the reference level of the luminance signal Y.

In the illustrated embodiment, the reference level of the color difference signal Pr is kept constant in the entire period thereof. Namely, as can be seen in FIG. 3, the reference level is constant in the whole period from the generation of the synchronizing signal $S_1$ (i.e., rise of the pulse $S_1$) to the extinguishment of the synchronizing signal $S_2$ (i.e., fall of the pulse $S_2$); the reference level is constant in the whole period from the generation of the synchronizing signal $S_2$ to the extinguishment of the synchronizing signal $S_3$; and the same is true for the subsequent adjacent synchronizing signals (i.e, pulses). Namely, the synchronizing signal falls to a predetermined lower level (i.e., constant value) from the reference level and raises to the reference level from the lower level.

The above discussion is also applied to the luminance signal Y. Namely, the reference level of the luminance signal is constant in the whole period from the raise of one of the adjacent luminance signal (i.e, pulse) to the fall of the other luminance signal.

The level of the synchronizing signal S is adjusted so that the total height "a" of the luminance signal (Y+S) is identical to the total height "b" of the color difference signal (Pr+S), taking into account the FM modulation of the luminance signal (Y+S) and the color difference signal (Pr+S) which will be effected in a subsequent stage.

The level adjustment of the synchronizing signal S by the signal level adjusting circuits 28 and 29 is carried out as follows:

The maximum amplitudes of the luminance signal Y and the color difference signal Pr are set at predetermined values (for example, in accordance with the standard, if any). The amplitude of the synchronizing signal is determined, based on the preset maximum amplitudes.

The amplitude (i.e., maximum deviation) "c" of the synchronizing signal to be added to the color difference signal Pr from the reference level is not limited to a specific value, as long as the amplitude "c" is larger than the maximum amplitude "d" of the color difference signal with respect to the reference level thereof. Preferably, the value of "c" is sufficiently larger than the value of "d", so that the synchronizing signal can be easily separated from the color difference signal.

The signal level adjusting circuits 28 and 29 have a predetermined fixed amplification degree to make the amplitude of the synchronizing signal S outputted from the synchronizing signal generating circuit 18 identical to the set value mentioned above. Alternatively, the signal level adjusting circuits 28 and 29 may have a variable magnification which is set to a predetermined value.

The above discussion for the color difference signal (Pr+S) can be applied to the color difference signal (Pb+S), as mentioned above.

As can be understood from the foregoing, in the still video apparatus 1, according to the present invention, synchronizing signals S whose amplitude is larger than the amplitude (i.e., maximum deviation) of the color difference signals with respect to the reference level thereof are added to the color difference signals, which oscillate up and down with respect to the reference level, by the signal processing circuit. Accordingly, the detection and separation of the synchronizing signals from the color difference signals can be easily executed upon reproduction of the recorded data. Namely, the separation of the synchronizing signals from the color difference signals is as easy as the separation of the synchronizing signal from the luminance signal, resulting in a simplification of the circuitry.

Moreover, since the reference level of the color difference signals is made identical to the reference level of the synchronizing signals S in the horizontal and vertical blanking intervals of the color difference signals when the color difference signals are recorded, it is possible to clamp the color difference signals in the same way as the luminance signals, upon reproducing the recorded data, resulting in a simplified circuitry.

Terminals 23a, 23b and 23c (FIG. 1) of the selection switch 23 are connected to the synchronizing signal adding circuits 22A, 22B and 22C. The connection of the terminals 23a, 23b and 23c of the selection switch 23 is controlled by the system control circuit 10, so that the luminance signal (Y+S) and the color difference signals (Pr+S) and (Pb+S) are selectively and successively inputted to a record processing circuit 24 in which the FM-modulation of the signals inputted thereto is effected.

From the system control circuit 10 are outputted ID data (i.e., picture data) including data on the selection of field recording/frame recording; field number in case of the frame recording; selection of normal recording mode/high definition recording mode; the type of the picture signal to be recorded, i.e., discrimination of the luminance signal (Y+S)/the color difference signal (Pb+S)/the color difference signal (Pr+S); detection of the split areas (e.g., upper right/upper left/lower right/lower left portions of the picture plane in the case that the latter is split into four areas); recording track number; and photographing date, etc. A DPSK-modulation of a carrier wave generated in accordance with the synchronizing signal S outputted from the synchronizing signal generating circuit 18 is effected by an ID record processing circuit 25 in accordance with the ID data to obtain DPSK signals.

The DPSK-modulated ID data is superimposed on or multiplexed with the FM-modulated picture signals by an adder 26.

The multiplexed picture signals are amplified by the recording amplifier 27 which is controlled by the system control circuit 10 and are then recorded on the predetermined recording tracks of the rotating magnetic disc 9 by the magnetic head 6.

Upon recording the luminance signal (Y+S) and the color difference signals (Pr+S) and (Pb+S), terminals 23a, 23b and 23c are selectively and successively connected, so that the luminance signal (Y+S) and the color difference signals (Pr+S) and (Pb+S) are recorded on different recording tracks of the magnetic disc 9, respectively.

In case of the field recording, the picture signals for one picture plane, i.e., the picture signals for one field are recorded, for example, on the three recording tracks of the magnetic disc 9, and in case of the frame recording, the picture signals for one picture plane, i.e., the picture signals for two fields are recorded, for example, on the six recording tracks of the magnetic disc 9, respectively.

As mentioned above, in the illustrated embodiment, since the luminance signal (Y+S) and the color difference signals (Pr+S) and (Pb+S) are recorded on different recording tracks of the magnetic disc 9, not only can the recording frequency bands of the luminance signal and the color difference signals to be recorded be expanded, but also the ratio of the frequency bands of the luminance signal and the color difference signals can be optionally selected.

Since the synchronizing signals S are added to the luminance signal (Y+S) and the color difference signals (Pr+S) and (Pb+S), if only one of the luminance signal and the color difference signals is read and reproduced from the associated recording track of the magnetic disc 9, high quality picture signals having no noise can be obtained.

Figure 2:
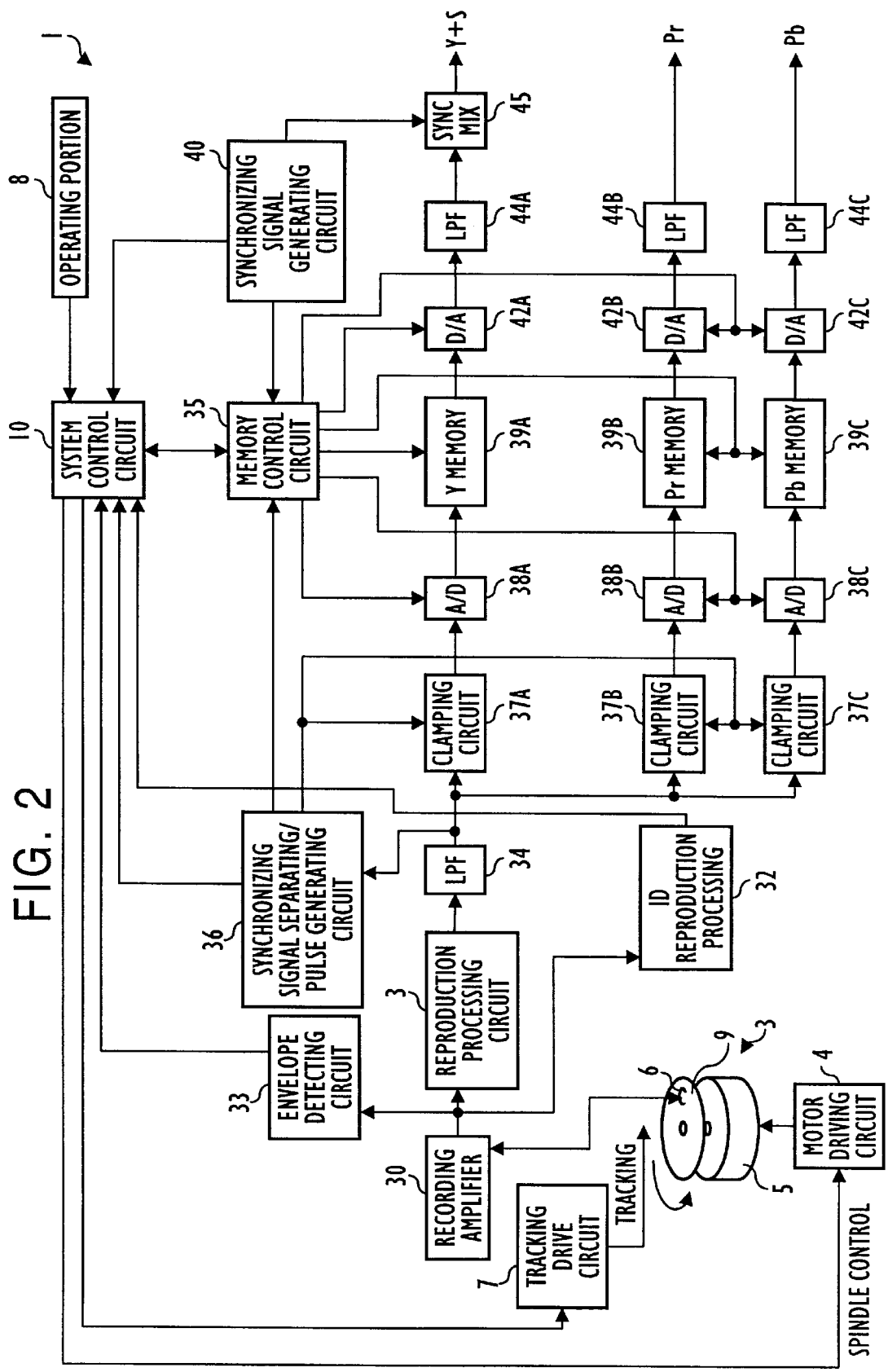
FIG. 2 is a block diagram of a reproducing system of a still video apparatus having a signal processing circuit incorporated therein, according to the present invention, by way of example.

FIG. 2 shows a block diagram of a reproducing system in a still video apparatus having a signal processing circuit according to the present invention.

In FIG. 2, the magnetic disc driving mechanism 3 which is constituted by the magnetic disc 9, the motor driving circuit 4, the spindle motor 5, the magnetic head 6 and the tracking drive circuit 7, the operating portion 8, the indicator (not shown), and the system control circuit 10 are the same as or common to those for the recording system shown in FIG. 1.

The magnetic head 6 is successively moved to predetermined recording tracks of the rotating magnetic disc 9, each having the picture signals corresponding to one still picture, recorded thereon, in a predetermined order to successively read the recorded picture signals and DPSK signals.

The picture signals, etc., read by the magnetic head 6 are amplified by the reproducing amplifier 30. Among the picture signals, the luminance signal (Y+S) and the color difference signals (Pr+S) and (Pb+S) are inputted to a reproduction processing circuit 31 of the picture signals through respective high pass filters (not shown) and are FM-demodulated. The read DPSK signals are inputted, through a band pass filter (not shown), to an ID reproduction processing circuit 32 wherein the DPSK demodulation is carried out to obtain ID data. The ID data thus obtained is inputted to the system control circuit 10.

An envelope detecting circuit 33 is connected to the output side of the reproducing amplifier 30, so that the envelope detecting circuit 33 detects the envelope of the reproducing signals read out by the magnetic head 6 and outputs a corresponding detection signal to the system control circuit 10. The system control circuit 10 controls the tracking drive circuit 7 to obtain the maximum output of the detection signal of the envelope to thereby effect the auto-tracking operation of the magnetic head 6.

Consequently, a high quality still picture is obtained through the auto-tracking operation of the magnetic head 6 and the control of the phase of rotation of the spindle motor 5 which will be discussed below.

The luminance signal (Y+S) and color difference signals (Pr+S), (Pb+S), FM-demodulated by the reproduction processing circuit 31 are fed to a low pass filter 34 to eliminate the high frequency components thereof. Thereafter, the synchronizing signals S are separated from the luminance signal and the color difference signals by a synchronizing signal separating/pulse generating circuit 36, respectively, and are inputted to the system control circuit 10. The synchronizing signals S inputted to the system control circuit 10 are used to read for example the ID data.

The writing clock signals, with reference to which data is written in the respective memories and various timing pulse signals are generated by the synchronizing signal separating/pulse generating circuit 36. The writing clock signals and the timing pulse signals thus generated are inputted to a memory control circuit 35 and clamping circuits 37A, 37B and 37C, respectively.

The FM-demodulated luminance signal (Y+S) is clamped by the clamping circuit 37A, and converted to a digital signal by an A/D converter 38A, and stored in the Y memory 39A. The clamping circuit 37A operates in response to the timing pulse (clamp pulse) signal outputted from the synchronizing signal separating/pulse generating circuit 36.

The FM-demodulated color difference signal (Pr+S) is clamped by the clamping circuit 37B, and converted to a digital signal by an A/D converter 38B, and stored in the Pr memory 39B. Similarly, the FM-demodulated color difference signal (Pb+S) is clamped by the clamping circuit 37C, converted to a digital signal by an A/D converter 38C, and stored in the Pb memory 39C. The clamping circuits 37B and 37C operate in response to the timing pulse (i.e., clamp pulse) signals outputted from the synchronizing signal separating/pulse generating circuit 36.

The system control circuit 10 judges whether the picture signal read through the magnetic head 6 is the luminance signal Y, the color difference signal Pr, or the color difference signal Pb, in accordance with the reproduced ID data to thereby control the operation of the memory control circuit 35.

The memory control circuit 35 performs the following control in accordance with the writing clock signals and the timing pulse signals, outputted from the synchronizing signal separating/pulse generating circuit 36, while controlling the writing timing of data into the memories 39A, 39B and 39C.

The A/D converter 38A operates in accordance with the writing clock signal, and the memory control circuit 35 actuates a writing address counter incorporated therein to write digital data of the luminance signals Y in the Y memory 39A at predetermined addresses.

Also, the A/D converter 38B operates in accordance with the writing clock signal, and the memory control circuit 35 actuates the writing address counter to write digital data of the color difference signal Pr in the Pr memory 39B at predetermined addresses.

Similarly, the A/D converter 38C operates in accordance with the writing clock signal, and the memory control circuit 35 actuates the writing address counter to write digital data of the color difference signal Pb in the Pb memory 39C at predetermined addresses.

Note that no sampling of the synchronizing signals S contained in the reproduced luminance signal and color difference signals is effected, so that no synchronizing signal S is written in the memories.

The synchronizing signals S in accordance with, for example, the NTSC system are generated in the synchronizing signal generating circuit 40. In addition to the generation of the synchronizing signals S, the synchronizing signal generating circuit 40 generates memory reading clock signals (referred to as reading clock signals), in accordance with which the stored data is read from the respective memories and various timing pulse signals, through a clock generating circuit (not shown) incorporated therein. The reading clock signals and the timing pulse signals thus generated are inputted to the memory control circuit 35.

The memory control circuit 35 performs the following control in accordance with the reading clock signals and the timing pulse signals, outputted from the synchronizing signal generating circuit 40, while controlling the reading timing of data into the memories 39A, 39B and 39C.

In accordance with the reading clock signals and the timing pulse signals, the memory control circuit 35 actuates a reading address counter incorporated therein to read digital data of the luminance signals Y from a predetermined address of the Y memory 39A. At the same time, the D/A converter 42A operates to convert the digital luminance signal Y thus read to an analog signal.

The memory control circuit 35 actuates the reading address counter to read digital data of the color difference signals Pr and Pb stored in the Pr memory 16B and the Pb memory 16C at predetermined addresses, respectively, in accordance with the reading clock signals and the timing pulse signals. At the same time, the D/A converters 42B and 42C operate to convert the digital color difference signals thus read out to analog signals.

Note that the selection of the writing mode or the reading mode of the memories is controlled in the memory control circuit 35 in accordance with a mode change command signal outputted from the system control circuit 10.

The synchronizing signals S outputted from the synchronizing signal separating/pulse generating circuit 36 and the synchronizing signal generating circuit 40 are inputted also to the system control circuit 10, so that the synchronizing signals S can be employed to control the phase of rotation of the spindle motor 5 or utilized as timing signals for other operations.

In the case where a standard picture (e.g., NTSC signal) is reproduced, the writing clock signal generated by the synchronizing separating/pulse generating circuit 36 and the reading clock signal generated by the synchronizing signal generating circuit 40 have an identical frequency.

The luminance signal Y thus converted to an analog signal is sent to the low pass filter 44A to cut a high frequency component thereof. Thereafter, the synchronizing signal S from the synchronizing signal generating circuit 40 is added to the luminance signal Y by a synchronizing signal adding circuit 45.

The color difference signals Pr and Pb, thus converted to analog signals are sent to respective low pass filters 44B and 44C to eliminate high frequency component thereof.

The luminance signal (Y+S) and the color difference signals Pr and Pb, thus obtained are outputted as video signals through respective output circuits (not shown), so that a still picture can be reproduced in an external display of a video apparatus connected thereto.

In the illustrated embodiment, as may be seen in FIG. 3, the level of the synchronizing signal S is adjusted such that the amplitude (total height) "a" of the luminance signal (Y+S) is identical to the amplitude (i.e., total height) "b" of the color difference signals (Pr+S) and (Pb+S). Alternatively, if the picture signals are recorded or reproduced in a format different from the recording format of the still video apparatus, the value of "a" may be different from the value of "b".

Although the reference level of the color difference signals (Pr+S) and (Pb+S) is constant in the whole period, as shown in FIG. 3, in the illustrated embodiment, the "constant" reference level over the whole period is not always necessary in the signal processing circuit, according to the present invention. For example, it is possible to make the reference level of the color difference signals (Pr+S) and (Pb+S) identical to the reference level of the synchronizing signal S only within a part $t_3$ of the period from the generation of the synchronizing signal $s_1$ (i.e., raised portion of the pulse $s_1$) to the extinguishment of the adjacent synchronizing signal s2 (i.e., bottom portion of the pulse $s_2$), as shown in FIG. 4.

Furthermore, in the illustrated embodiment, the color difference signals Pr and Pb are recorded on different recording tracks, but it is possible to record the color difference signals Pr and Pb on the same recording track or tracks (i.e., one recording track or two recording tracks). In this alternative, the color difference signals Pr and Pb are recorded either in the line-sequence recording method, or in a split recording method in which each of the color difference signals Pr and Pb to be recorded is split into a plurality of signal portions (e.g., former and latter halves) within one horizontal synchronization period (i.e., time between two adjacent horizontal synchronizing signals).

Although the above discussion has been directed to a signal processing circuit applied to a still video apparatus in which the standard picture of NTSC signals is recorded or reproduced, the present invention can be also applied to a still video apparatus in which a high definition picture, such as a picture signal of HDTV system is recorded or reproduced.

Moreover, the present invention can also be applied to a still video apparatus having a recording mode switching means for automatically or manually switching the record processing system in accordance with the system of the picture signals inputted to the recorder of the still video apparatus. In this application, the signal reproducing means of the still video apparatus is preferably provided with a reproduction mode switching means for automatically or manually switching the reproduction processing system in accordance with the recording system of the picture signals to be reproduced.

For the recording of a high definition image, it is possible to divide one picture plane into a plurality of zones on the image memory in order to match the high definition image to a recordable frequency band of the magnetic disc 9, so that the picture signals of the divided zones are recorded on the different recording tracks of the magnetic disc 9. In this case, the frequency of the reading clock signal of the recording system is lower than the frequency of the writing clock signal. Consequently, the time axis is extended in comparison with the picture signals inputted to the recording system, so that the picture signals can be recorded at a lower frequency band. This makes it possible to record the high definition picture signals of relatively wide frequency band on the magnetic disc whose recording frequency band is narrow.

To reproduce the high definition picture signals recorded with an extended time axis, the frequency of the reading clock signal of the memory of the reproducing system is higher than that of the writing clock signal, so that the picture signals whose time axis is compressed in comparison with that of the picture signals read out through the magnetic head 6 can be reproduced. Namely, the state of the picture signals to be reproduced are the same as the state of those that have been inputted to the recording system.

Although the ratio between the number of the recording tracks on which the luminance signals Y are recorded, the number of the recording tracks on which the color difference signals Pr are recorded, and the number of the recording tracks on which the color difference signals Pb are recorded is 1:1:1 in the illustrated embodiment, the ratio is not limited thereto and can be, for example, 2:1:1.

Although there is one magnetic head provided for recording and reproducing the picture signals in the illustrated embodiment, it is possible to provide more than one magnetic head for each of the recording and reproducing systems. In this alternative, for example, one magnetic head is provided for each of the luminance signal Y, the color difference signal Pr, and the color difference signal Pb, or one magnetic head is provided for each field.

Furthermore, the signal processing circuit according to the present invention can be applied not only to a still video apparatus in which only the frame recording or field recording can be effected, but also to a still video apparatus in which both the frame recording and the field recording can be effected.

Also, the signal processing circuit according to the present invention can be applied not only to a still video apparatus having a recording system only, but also to a still video apparatus having a recording system and a reproducing system.

The recording medium of the picture signals used in a still video apparatus having a signal processing circuit according to the present invention is not limited to a magnetic recording medium such as a magnetic disc, and can be, for example, an optical recording medium, an opto-magnetic recording medium, or a medium having an IC memory (e.g., IC memory card), etc.

The application of the signal processing circuit according to the present invention is not limited to a still video apparatus. It can be applied to any apparatuses, including a video apparatus to add a synchronizing signal to a signal which oscillates to both sides with respect to a reference level.

The present invention is not limited to the illustrated embodiments. Namely, the signal processing circuit according to the present invention generically includes a synchronizing signal adding means for adding a synchronizing signal to a signal which oscillates to both sides with respect to a reference level, and a signal level adjusting means for adjusting the level of the synchronizing signal, wherein the reference level of the synchronizing signal is kept substantially identical to the reference level of the oscillating signal to which the synchronizing signal is to be added by the signal level adjusting means, and the amplitude of the synchronizing signal from the reference level thereof is larger than the maximum deviation of the oscillating signal on the side of the synchronizing signal from the reference level thereof.

As can be understood from the above discussion, according to the present invention, a synchronizing signal added to a signal which oscillates to both sides (i.e., in opposite directions) from a reference level thereof can be easily separated from the oscillating signal.

Furthermore, according to the present invention, a signal which oscillates to both sides (i.e., in opposite directions) from a reference level thereof can be treated as a signal which oscillates to only one side (i.e., in only one direction) from the reference level, for example, upon separation of a synchronizing signal added to the oscillating signal therefrom, thus resulting in a simplification of a signal processing circuit.

In particular, in a video apparatus or a still video apparatus having a signal processing circuit incorporated therein, according to the present invention, not only can the composite synchronizing signals be separated from the color difference signals as easy as the separation of the composite synchronizing signal from the luminance signal, but also the color difference signals can be continuously clamped in the horizontal and vertical blanking intervals, thus resulting in a good DC reproduction.

In addition to the foregoing, according to the present invention, since the separation of the synchronizing signals from the color difference signals and the clamping of the color difference signals can be easily carried out similar to the luminance signal, the synchronizing signal separating circuit, the clamping circuits, and the circumferential circuits thereof can be simplified.

We claim:

1. An apparatus for processing a video signal, comprising:
    means for receiving a color difference signal;
    means for producing a horizontal synchronizing signal that is associated with said color difference signal; and
    means for adding said horizontal synchronizing signal produced by said producing means to a horizontal blanking period and a vertical blanking period of said color difference signal, wherein a reference level of said color difference signal and a reference level of said horizontal synchronizing signal are equal in both said vertical blanking period and said horizontal blanking period, said adding means adjusting an amplitude of said horizontal synchronizing signal to be larger than a maximum deviation of said color difference signal.

2. The apparatus of claim 1, wherein said video signal comprises a still video image obtained with a still video camera.

3. The apparatus of claim 1, wherein said horizontal synchronizing signal oscillates to one side from a reference level of said horizontal synchronizing signal.

4. The apparatus of claim 3, wherein said reference level of said horizontal synchronizing signal comprises a pedestal level.

5. The apparatus of claim 1, further comprising means for recording said color difference signal, containing said horizontal synchronizing signal added to said horizontal blanking period and said vertical blanking period, to a recording medium.

6. The apparatus of claim 5, wherein said recording medium comprises a magnetic disc.

7. The apparatus of claim 1, further comprising means for receiving a luminance signal, wherein said luminance signal and said color difference signal, corresponding to one picture plane, are recorded onto different recording tracks of a recording medium having a plurality of tracks.

8. An apparatus for processing a video signal, comprising:

means for receiving a luminance signal and a color difference signal representing a video image to be processed;

a synchronizing signal adder that combines a synchronizing signal with said color difference signal; and a signal level adjustor that adjusts an amplitude of said synchronizing signal to be larger than a maximum amplitude of said color difference signal with respect to a reference level in a horizontal blanking interval of said color difference signal and a reference level in a vertical blanking interval of said color difference signal, said reference level of said color difference signal being substantially identical to a reference level of said synchronizing signal within said horizontal blanking interval of said color difference signal and said vertical blanking interval of said color difference signal.

9. The apparatus of claim 8, wherein said synchronizing signal oscillates to one side from a reference level of said synchronizing signal.

10. The apparatus of claim 9, wherein said reference level of said synchronizing signal comprises a pedestal level.

11. The apparatus of claim 8, further comprising a recording device that records said luminance signal and said color difference signal to which said synchronizing signal has been added to a recording medium.

12. The apparatus of claim 11, wherein said recording medium comprises a magnetic disc.

13. The apparatus of claim 12, wherein said luminance signal and said color difference signal to which said synchronizing signal has been added, corresponding to one picture plane, are recorded onto different recording tracks of said magnetic disc.

14. An apparatus for processing luminance signals and color difference signals corresponding to one picture plane to be recorded onto different tracks of a recording medium having a plurality of recording tracks, comprising:

a synchronizing signal adder that adds horizontal synchronizing signals to said luminance signals and to said color difference signals; and a color signal level adjustor that provides said horizontal synchronizing signals to a vertical blanking period and a horizontal blanking period of said color difference signal, wherein a pedestal level of said color difference signal and a pedestal level of said horizontal synchronizing signals are equal in both said vertical blanking period and said horizontal blanking period, said color signal level adjuster adjusts an amplitude of said horizontal synchronizing signals, with respect to said pedestal level, to be larger than a maximum deviation of said color difference signals.

15. The apparatus of claim 14, wherein a reference level of said horizontal synchronizing signals within said horizontal blanking period and said vertical blanking period of said color difference signals is substantially identical to a reference level of said color difference signals.

16. The apparatus of claim 14, further comprising:

a second color signal level adjustor that provides said horizontal synchronizing signals to a vertical blanking period and a horizontal blanking period of said luminance signals, wherein a pedestal level of said color difference signal in said horizontal blanking period is equal to a pedestal level of said vertical blanking period.

17. The apparatus of claim 14, further comprising a recording device that records said one picture plane onto said recording medium.

18. The apparatus of claim 15, wherein said horizontal synchronizing signals oscillate to one side from said reference level of said horizontal synchronizing signals.

19. The apparatus of claim 1, further comprising a recording medium having a plurality of tracks, said color difference signal being stored on one track of said recording medium.

20. The apparatus of claim 14, further comprising a recording medium having plurality of tracks, said color difference signal being stored on one track of said recording medium.

* * * * *